United States Patent [19]
Lin et al.

[11] Patent Number: 5,508,841
[45] Date of Patent: Apr. 16, 1996

[54] SPATIAL LIGHT MODULATOR BASED PHASE CONTRAST IMAGE PROJECTION SYSTEM

[75] Inventors: Tsen-Hwang Lin, Dallas; James M. Florence, Richardson; Michael Leddy, Dallas; Mark Boysel, Plano, all of Tex.

[73] Assignee: Texas Instruments Incorporated, Dallas, Tex.

[21] Appl. No.: 369,979

[22] Filed: Jan. 9, 1995

Related U.S. Application Data

[63] Continuation of Ser. No. 121,709, Sep. 15, 1993, abandoned.

[51] Int. Cl.$^6$ ............................................. G02F 1/31
[52] U.S. Cl. .................... 359/318; 359/259; 359/263; 359/276
[58] Field of Search ......................... 359/259, 263, 359/276, 277, 559–562, 577, 316, 318; 382/31, 42, 43, 278–280, 284

[56] References Cited

U.S. PATENT DOCUMENTS

| | | | |
|---|---|---|---|
| 4,680,579 | 7/1987 | Ott | 348/755 |
| 4,950,880 | 8/1990 | Hayner | 250/201.9 |
| 4,954,789 | 9/1990 | Sampsell | 359/318 |
| 5,061,049 | 10/1991 | Hornbeck | 359/224 |
| 5,096,279 | 3/1992 | Hornbeck et al. | 359/230 |
| 5,148,157 | 9/1992 | Florence | 345/84 |
| 5,229,592 | 7/1993 | Horwitz et al. | 250/201.9 |
| 5,256,869 | 10/1993 | Lin et al. | 250/201.9 |
| 5,278,652 | 1/1994 | Urbanus et al. | 348/571 |
| 5,327,286 | 7/1994 | Sampsell et al. | 359/561 |

FOREIGN PATENT DOCUMENTS

| | | | |
|---|---|---|---|
| 0391529 | 10/1990 | European Pat. Off. | G09F 9/37 |
| 0477566 | 1/1992 | European Pat. Off. | G02B 26/08 |
| 2607915 | 10/1988 | France | F41G 7/26 |

OTHER PUBLICATIONS

Lohmann et al., Array Illuminator Based on Phase Contrast 15 Jul. 1988, Applied Optics, N.Y. N.Y., vol. 27, No. 14, pp. 2915–2921.

Horsky et al., Electron-beam-addressed membrane mirror light modulator for projection display, 10 Jul. 1992, Applied Optics, N.Y.N.Y., vol. 31, No. 20, pp. 3980–3990.

Optron Systems, Inc. Brochure, Jan. 1, 1992, 4 pages, "Flickerless Infrared Scene Projectors & Electron-Beam-Addressed Membrane Light Modulator".

*Primary Examiner*—John D. Lee
*Attorney, Agent, or Firm*—Charles A. Brill; James C. Kesterson; Richard L. Donaldson

[57] ABSTRACT

A phase-contrast DMD based image system 36 for projecting an amplitude and phase modulated image. A flexure beam DMD array 34 is used to allow analog phase modulation of reflected light 38. The phase modulation is converted to amplitude modulation by the phase-contrast imaging optics including a phase plate 42. The resulting amplitude modulated wave is flicker-free and does not need to be synchronized to optical image sensors.

20 Claims, 1 Drawing Sheet

SPATIAL LIGHT MODULATOR BASED PHASE CONTRAST IMAGE PROJECTION SYSTEM

This application is a Continuation of patent application Ser. No. 08/121,709, filed Sep. 15, 1993, abandoned.

BACKGROUND OF THE INVENTION

1. Field of the Invention

This invention relates to the field of image projection systems and more particularly to phase contrast image projection systems.

2. Background of the Invention

Spatial light modulators (SLM) are used to modulate radiant energy, such as visible and non-visible light, in optical systems. Spatial light modulators are divided into one or two dimensional arrays of modulation elements called pixels, or picture elements, that represent the smallest addressable unit within the device. The SLM pixel is used to modulate the light distribution within the optical system.

In practice, the light modulation characteristics of most prior art SLMs are coupled combinations of amplitude and phase changes. The modulation characteristic of a pixel is usually controlled by a single applied signal, either an electrical voltage, current or incident optical intensity level, so the amplitude and phase characteristics of the pixel cannot be independently Depending on the design of the SLM, either the amplitude or phase modulation characteristic may dominate the output of the SLM. One type of SLM is the digital micro-mirror device (DMD). DMDs have been used to project images using either Schlieren or dark-field optics. Ott teaches the use of a membrane DMD and a cantilever beam DMD with Schlieren optics to amplitude modulate light in U.S. Pat. No. 4,680,579 issued Jul. 14, 1987. Hornbeck teaches the use of a digital torsion beam DMD and a cantilever beam DMD with dark-field optics to amplitude modulate light in U.S. Pat. No. 5,096,279 issued Mar. 17, 1992. Florence teaches the use of a flexure beam DMD to either phase modulate, or both amplitude and phase modulate light in U.S. Pat. No. 5,148,157 issued Sep. 15, 1992. To independently modulate both the amplitude and phase of incident light requires two SLM elements which requires either doubling the number of elements in the array or reducing the image resolution. This constraint, especially for high resolution display systems, increases both the manufacturing cost of the SLM and the complexity of the associated drive electronics.

The human eye, as well as most image sensors, does not detect phase changes in incident light. Therefore, in order to project a visible image, systems have been limited to simple techniques creating an image using amplitude modulation techniques with associated dependence on Schlieren optics or digital torsion beam implementations with dark field optics. Schlieren optical systems generally have low brightness and require a large light source. Digital torsion beam approaches turn a pixel either on or off and require some type of pulse-width modulation to achieve varying contrast or gray scale output levels. Pulse-width modulation can create visual artifacts in displayed images and typically requires image sensors to be synchronized to prevent image flicker.

A need exists for a modulation scheme that can produce bright, gray scale visual images while eliminating flicker and reducing or eliminating visual artifacts.

SUMMARY OF THE INVENTION

The present invention provides an analog DMD image projection system capable of displaying an amplitude modulated image. A flexure beam DMD is used to create a phase modulated wavefront. The wavefront is focused onto a wave phase plate which alters the relative phase of the light allowing the reconstituted light to interfere. The interference results in amplitude modulation or a selected combination of amplitude and phase modulation in the resulting wave. Unlike a true Schlieren technique which relies on total suppression of the DC component or zeroth-order Fourier of the modulated energy, this technique attenuates the intensity of the DC component and shifts the relative phase of the DC component $\pi/2$ radians.

Because of the wide bandwidth capability of the DMD mirrors, a DMD imaging system may be used for any wavelength of light, including infrared. The DMD is highly reflective, so there is very little heating of the mirrors. This results in a durable display device and allows a different temperature background which is particularly important for uses such as infrared image projection. The phase-contrast modulation scheme produces a flicker-free gray scale image allowing its use in applications that previously required synchronization between the display system and an image sensor.

BRIEF DESCRIPTION OF THE DRAWINGS

FIG. 1b is a section view of the flexure beam micro-mirror device of FIG. 1a taken along line B—B of FIG. 1a.

DETAILED DESCRIPTION OF THE PREFERRED EMBODIMENTS

Figure 1A:
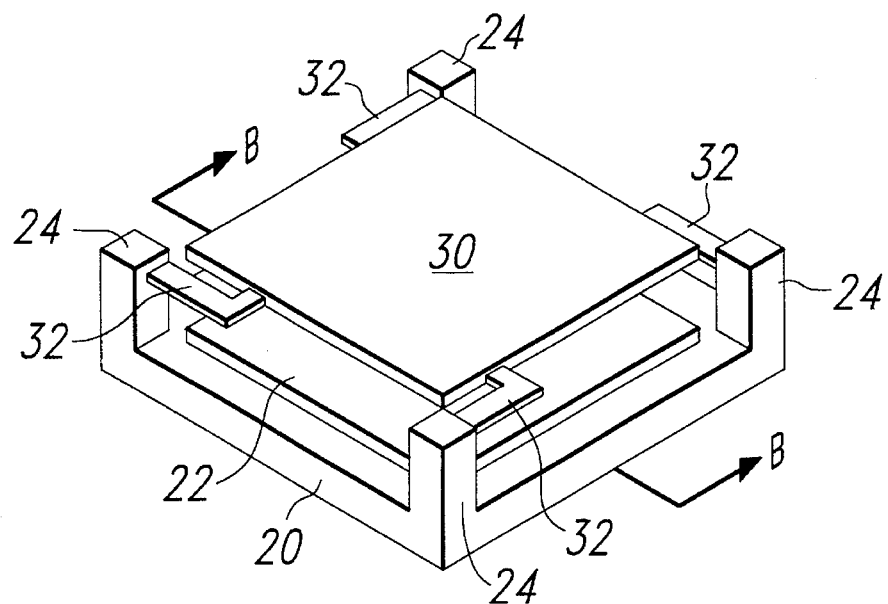
FIG. 1a is a perspective view of one embodiment of a flexure beam micro-mirror device.
Figure 1B:
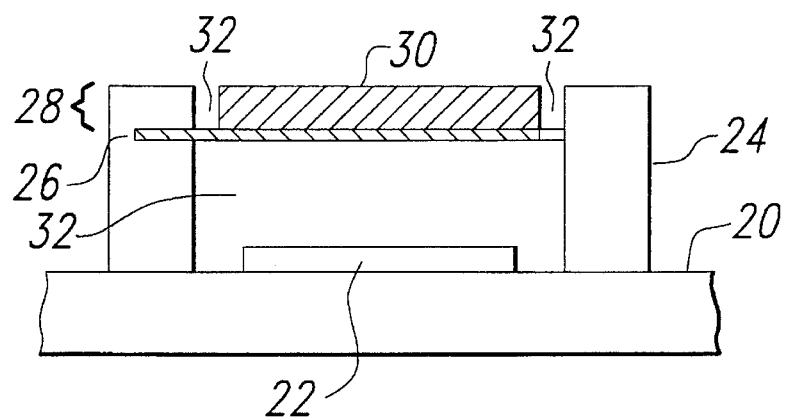

One element of a flexure beam DMD array is shown in FIGS. 1a and 1b. FIGS. 1a and 1b, as well as, are not drawn to scale but rather certain features have been enlarged for illustration purposes. The DMD is fabricated on a substrate 20 and has addressing circuitry formed on it. The substrate 20 is typically silicon but could be other materials such as gallium-arsenide. The design of the addressing circuitry depends on the scheme used to address the DMD and can include shift registers, amplifiers, latches, and voltage drivers among other possibilities. The addressing circuitry is used to drive an address electrode 22 which is fabricated on the surface of the substrate.

After the addressing circuitry is completed, a planarizing spacer layer is applied to the substrate. Support posts 24 are constructed and a thin metal hinge layer 26 is deposited on top of the spacer layer. After patterning the hinge layer, a thick metal mirror layer 28 is deposited onto the hinge layer. The hinge and mirror metal layers are etched to form the mirror 30 and flexure hinges 32 and the spacer layer is removed from below the mirror. The mirror 30 is now suspended over the address electrode 22 by the flexure hinges 32.

In operation, a voltage is applied to address electrode 22. If the potential of the address electrode 22 is different from the potential of mirror 30, an electrostatic attractive force will be generated between the address electrode 22 and the mirror 24. The electrostatic force will cause the mirror 30 to deflect into the well 32 beneath the mirror. The distance traveled by the deflected mirror 30 depends on the magnitude of the potential difference between the mirror and the address electrode 22 as well as the original air gap between them.

Figure 2:
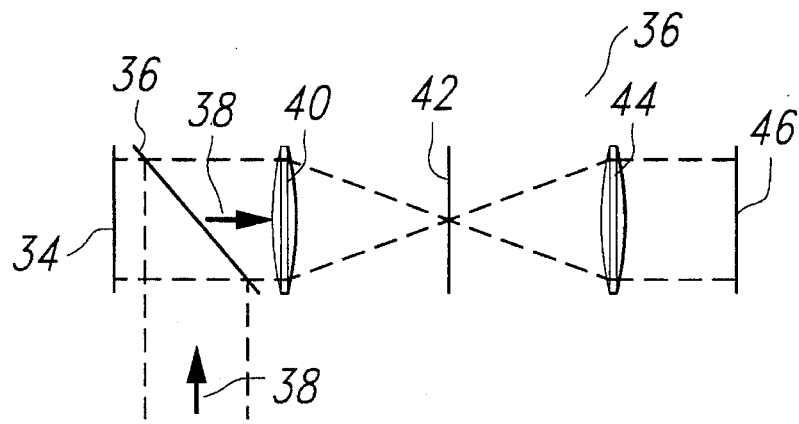
FIG. 2 is a schematic view of one embodiment of a phase contrast image projector using a flexure beam micro-mirror device.

FIG. 2 shows the flexure beam DMD 34 in an optical projection system 36. Coherent light 38 is focused onto the DMD array 34, typically normal to the mirror surface. Deflecting the mirror elements serves to lengthen the light path and retard the phase of the reflected wave. Therefore, the output of the flexure beam DMD array 34 is a phase modulated wave. The incident and reflected light beams may be separated by beamsplitter 36. The reflected wave 38 contains both the phase and amplitude information imparted by the DMD.

The phase modulated wave may be converted to an amplitude modulated wave through the phase-contrast process. Assuming that the incident coherent wave is $E_o \sin\omega t$ and the phase modulation imparted by the DMD array is $\phi(y,z)$, the constant amplitude composite wave is shown in the following equation.

$$E_{pm}(y,z,t) = E_o \sin(\omega t + \phi(y,z))$$

The wave may be reformulated as:

$$E_{pm}(y,z,t) = E_o \sin\omega t \cos\phi + E_o \cos\omega t \sin\phi$$

If $\phi$ is limited to very small values, typically less than 0.3 radians, such that $\sin\phi \approx \phi$ and $\cos\phi \approx 1$, then this becomes:

$$E_{pm}(y,z,t) = E_o \sin\omega t + E_o \phi(yz) \cos\omega t$$

The first term is independent of the phase delay while the second term is not. By changing the relative phase of the two part equation by $\pi/2$ radians, the two terms may be made to interfere producing the amplitude modulated wave:

$$E_{am}(y,z,t) = E_o[1+\phi(yz)]\cos\omega t$$

In practice, the phase shift is accomplished by focusing the reflected beam with lens 40 and placing a phase plate 42 in the transform plane of the focused reflected beam. The phase plate 42 has a different optical length through the zeroth-order portion compared to the higher-order portion thereby changing the phase relationship of the zeroth-order relative to the higher orders. The phase plate 42 may either retard the relative phase of the zeroth-order component of the reflected wave by $\pi/2$ radians, or it may retard the relative phase of all but the zeroth-order component by $3\pi/2$ radians. This phase delay causes the zeroth-order wave, containing the DC information to be in phase with the higher-order components which contain the phase information imparted by the DMD array. The reflected light is then refocused by lens 44 onto image plane 46. Because the two waves are in phase, interference will occur and the phase modulation will produce an amplitude modulated wave. The contrast ratio of the resulting image may be improved by attenuating the zeroth-order component to the magnitude of $\phi(y,z)$.

A practical limitation of this approach is the limited travel of the DMD mirror. Practice has found that if the mirror is displaced more than approximately 33% of the distance between the mirror and the address electrode, the mirror may collapse into the well and the DMD structure may be permanently damaged. Good contrast ratios are possible with a phase modulation of only one radian without attenuating the zeroth order component of the wave. Because of the reflective nature of the DMD, the optical path of the incident light is lengthened by twice the distance of the mirror deflection. For this extreme example, a flexure beam DMD with an air gap of 4 µm could allow a phase modulation of approximately 1 radian of 12 µm wavelength incident light while limiting mirror travel to only 25% of the air gap. However, one radian is too large for the above approximation, $\sin\phi \approx \phi$ and $\cos\phi \approx 1$, to be valid. To revalidate the approximation and obtain a sufficient contrast ratio requires attenuating the zeroth-order component to approximately 30% of the original intensity for a phase modulation of 0.3 radians. The light source is chosen to provide sufficient incident energy.

Thus, although there has been described to this point a particular embodiment for a method and system for creating a phase contrast image, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of amplitude modulation of visible and non-visible light comprising:

providing a coherent incident beam of light having a selected frequency;

deflecting at least one selected element of an array of deflectable micro-mirror elements;

reflecting said incident beam of light from said deflected micro-mirror element to form a reflected beam of light, wherein the path of said reflected light is lengthened by said deflecting step, thereby altering the phase of said reflected light;

focusing said reflected beam to separate the zeroth-order components from the other components; and altering the relative phase of said reflected beam to cause interference between said zeroth-order component and said other components.

2. The method of claim 1 wherein said zeroth order is retarded $\pi/2$ radians.

3. The method of claim 1 wherein said selected frequency of said incident beam of light is an infrared frequency.

4. The method of claim 1 further comprising the step of separating said reflected beam from said incident beam;

5. The method of claim 1 wherein each of said elements of said array of deflectable micro-mirror elements comprises a mirror suspended over an electrode by flexure hinges.

6. The method of claim 1 further comprising the step of attenuating said zeroth-order component.

7. An image display system comprising:

a source of coherent light to project incident light along a light path;

a micro-mirror device array having addressable mirror elements located in said light path for reflecting said incident light so as to shift the phase of said reflected light;

a lens for focusing said reflected light, said focusing to separate said reflected light into a zeroth-order component and higher-order components; and a phase plate for altering the relative phase of said focused reflected light thereby causing interference between said zeroth-order component and said higher order components to produce amplitude modulated light.

8. The display system of claim 7 wherein said source is an infrared source.

9. The display system of claim 7 wherein said source is a visible source.

10. The display system of claim 7 wherein said source is an ultra-violet source.

11. The display system of claim 7 wherein said phase plate retards the zeroth-order of said reflected light by $\pi/2$ radians.

12. The display system of claim 7 wherein said phase plate attenuates the zeroth-order of said reflected light.

13. The display system of claim 7 further comprising a beamsplitter for separating said incident light from said reflected light.

14. An image display system comprising:
- an array having addressable modulator elements positioned to phase-modulate an incident beam of coherent light;
- means for separating said phase-modulated beam into a zeroth-order component and higher-order components;
- means for altering the relative phases of said components; and
- means for recombining said phase altered components so as to cause interference between said zeroth-order component and said higher order components.

15. The display system of claim 14 wherein said incident beam of coherent light is an infrared beam of coherent light.

16. The display system of claim 14 wherein said incident beam of coherent light is a visible beam of coherent light.

17. The display system of claim 14 wherein said incident beam of coherent light is an ultra-violet beam of coherent light.

18. The display system of claim 14 wherein said means for altering retards the zeroth-order of said separated light by $\pi/2$ radians.

19. The display system of claim 14 wherein said means for altering attenuates the zeroth-order of said separated light.

20. The display system of claim 14 further comprising a beamsplitter for separating said incident beam of coherent light from said phase-modulated beam.

* * * * *